United States Patent [19]

Lyons et al.

[11] 4,335,321

[45] Jun. 15, 1982

[54] ELECTRONIC BALANCE CONTROL CIRCUIT ARRANGEMENT

[75] Inventors: Michael D. Lyons; Richard A. Strobel, both of Lexington, Ky.

[73] Assignee: American Standard Inc., Lexington, Ky.

[21] Appl. No.: 103,800

[22] Filed: Dec. 14, 1979

[51] Int. Cl.³ ...................... H03K 17/72; H03K 5/153
[52] U.S. Cl. ............................... 307/252 B; 307/311; 307/355; 307/359
[58] Field of Search ............... 307/355, 356, 358, 359, 307/252 B, 236, 311; 328/146, 147; 323/282, 284, 285, 345, 351

[56] References Cited

U.S. PATENT DOCUMENTS 4,163,909 8/1979 Harr .............................. 307/359 X Primary Examiner—John Zazworsky
Attorney, Agent, or Firm—J. B. Sotak

[57] ABSTRACT

An electronic balance control circuit includes an OP-AMP comparator circuit for receiving a command signal and a feedback signal. A positive OP-AMP detector circuit for causing a first buffer trigger circuit to fire a first triac to energize a first output when the command signal is less than the feedback signal, and a negative OP-AMP detector for causing a second buffer trigger circuit to fire a second triac to energize a second output when the command signal is greater than the feedback signal.

14 Claims, 2 Drawing Figures

4,335,321

ELECTRONIC BALANCE CONTROL CIRCUIT ARRANGEMENT

FIELD OF THE INVENTION

This invention relates to an electronic balance control circuit and more particularly to a solid-state circuit arrangement for controlling an output condition in accordance with a command signal by feeding back a signal representative of the output condition and comparing the feedback signal to the command signal and causing the output condition to change until the feedback signal is equal to the command signal.

BACKGROUND OF THE INVENTION

In certain control aparatus, such as, in pressure monitoring systems for steel making furnaces, power generating plants, etc., it is necessary to closely control the exhaust gas pressure in the smokestack. Normally, the furnace smokestacks are provided with butterfly types of control valves which are power operated to manipulate the opening of the smokestack in order to continuously regulate the exhaust gas pressure. Presently, the butterfly valves are controlled by hydraulic types of servo positioning cylinders that are situated within the confines of the furnace smokestacks. Such an enclosed hydraulic system is not completely satisfactory since it is costly to initially purchase and expensive to subsequently maintain. Further, there was difficulty in replacing and repairing a malfunctioning servo system due to its remote location in the smokestack. Further, the extremely dirty and relatively high temperature conditions existing in smokestacks resulted in premature failure and caused unreliability of the servo types of control valves. In addition, it is found impractical and uneconomical to provide hydraulic conduits or lines leading from the smokestack to a central control center due to problems of leakage and the need of extremely high pressures. Thus, a viable exhaust pressure control system for smokestacks requires a minimum amount of components or parts within the smokestack to increase reliability and serviceability of the apparatus.

OBJECTS OF THE INVENTION

Accordingly, it is an object of this invention to provide a novel electronic balance control system which may be used to regulate a desired condition by monitoring and comparing a given command signal with a feedback signal.

A further object of this invention is to provide a new and improved solid-state control circuit which is arranged causing an output condition to assume a desired command condition be feeding back a signal representative of the actual output condition.

Another object of this invention is to provide a unique electronic circuit arrangement for controlling an output condition in accordance with a given command voltage and comparing a feedback voltage with command voltage for monitoring the output condition.

Still another object of this invention is to provide a solid-state balance control circuit arrangement for controlling an output condition in accordance with a command signal by feeding back a signal representative of the output condition and causing the output condition to change until the feedback signal is equal to the command signal.

Still a further object of this invention is to provide an electronic balance control circuit comprising a comparator circuit having a command signal input and a feedback signal input and producing a positive, a negative, and a zero output in response to the comparative value of the feedback signal relative to the command signal, a first detector circuit responsive to the positive output, a second detector circuit responsive to the negative output, a first buffer trigger circuit coupled to the first detector circuit for actuating a first gage circuit when the feedback signal is less than the command signal to thereby increase the feedback signal until the comparator circuit produces a zero output, and a second buffer trigger circuit coupled to the second detector circuit for actuating a second gate circuit when the feedback signal is greater than the command signal to thereby decrease the feedback signal until the comparator produces a zero output.

Yet another object of this invention is to provide a remote solid-state controller circuit for equalizing a command signal and a feedback signal comprising, a comparator means having a first input for receiving a command signal and having a second input for receiving a feedback signal, the comparator means producing an output signal having a first polarity when the command signal is greater than the feedback signal and producing an output signal having a second polarity when the command signal is less than the feedback signal, a first detector means responsive to the first polarity output signal for producing an output signal, a second detector means responsive to the second polarity for producing an output signal, a first buffer trigger means responsive to the output signal of the first detector means for energizing a first gating means up to the time that the feedback signal is the same as the command signal, and a second buffer trigger means responsive to the output signal of the second detector means for energizing a second gating means up to the time that the feedback signal is the same as the command signal.

Yet a further object of this invention is to provide a new and improved solid-state balance control circuit which is economical in cost, unique in design, efficient in operation, durable in service, dependable in use, and simple in construction.

SUMMARY OF THE INVENTION

In the attainment of the foregoing objects, there is provided an electronic balance control circuit arrangement including an integrated circuit operational amplifier comparator having a dual feedback network. The dual feedback network includes a low voltage resistive circuit and a high voltage resistive diode circuit which increases the sensitivity yet reduces the chance of spurious oscillation. The integrated circuit operational amplifier comparator includes a command signal input and a feedback signal input. The integrated circuit operational amplifier comparator produces a negative voltage when the command signal input is greater than the feedback signal input and produces a positive voltage when the command signal is less than the feedback signal input. A first integrated circuit operational amplifier detector produces a positive output signal in response to the positive voltage and includes a hysteresis network for reducing spurious oscillation. A first buffer trigger includes a first plurality of noninverting stages responsive to the positive output signal for illuminating a first light emitting diode indicator and for energizing a first opto-isolator. The first opto-isolator includes a first light emitter diode which illuminates and turns on a first phototransistor. The conduction of the first phototransistor triggers a first bidirectional switching device or triac for causing the energization of a first a.c. load so long as the command signal input is greater than the feedback signal input. A second integrated circuit operational amplifier detector produces a positive output signal responsive to the negative voltage and includes a hysteresis network for reducing spurious oscillation. A second buffer trigger includes a second plurality of noninverting stages responsive to the positive output signal for illuminating a second light emitting diode indicator and for energizing a second opto-isolator. The second opto-isolator includes a second light emitting diode which illuminates and turns on a second phototransistor. The conduction of the second phototransistor triggers a second bidirectional switching device or triac for causing the energization of a second a.c. load so long as the command signal input is less than the feedback signal input.

DESCRIPTION OF THE DRAWINGS

The foregoing objects and other attendant features and advantages will become more readily understood and appreciated as the subject invention is described in further detail and is considered in conjunction with the accompanying drawings, wherein.

DETAILED DESCRIPTION OF THE INVENTION

Figure 1A:
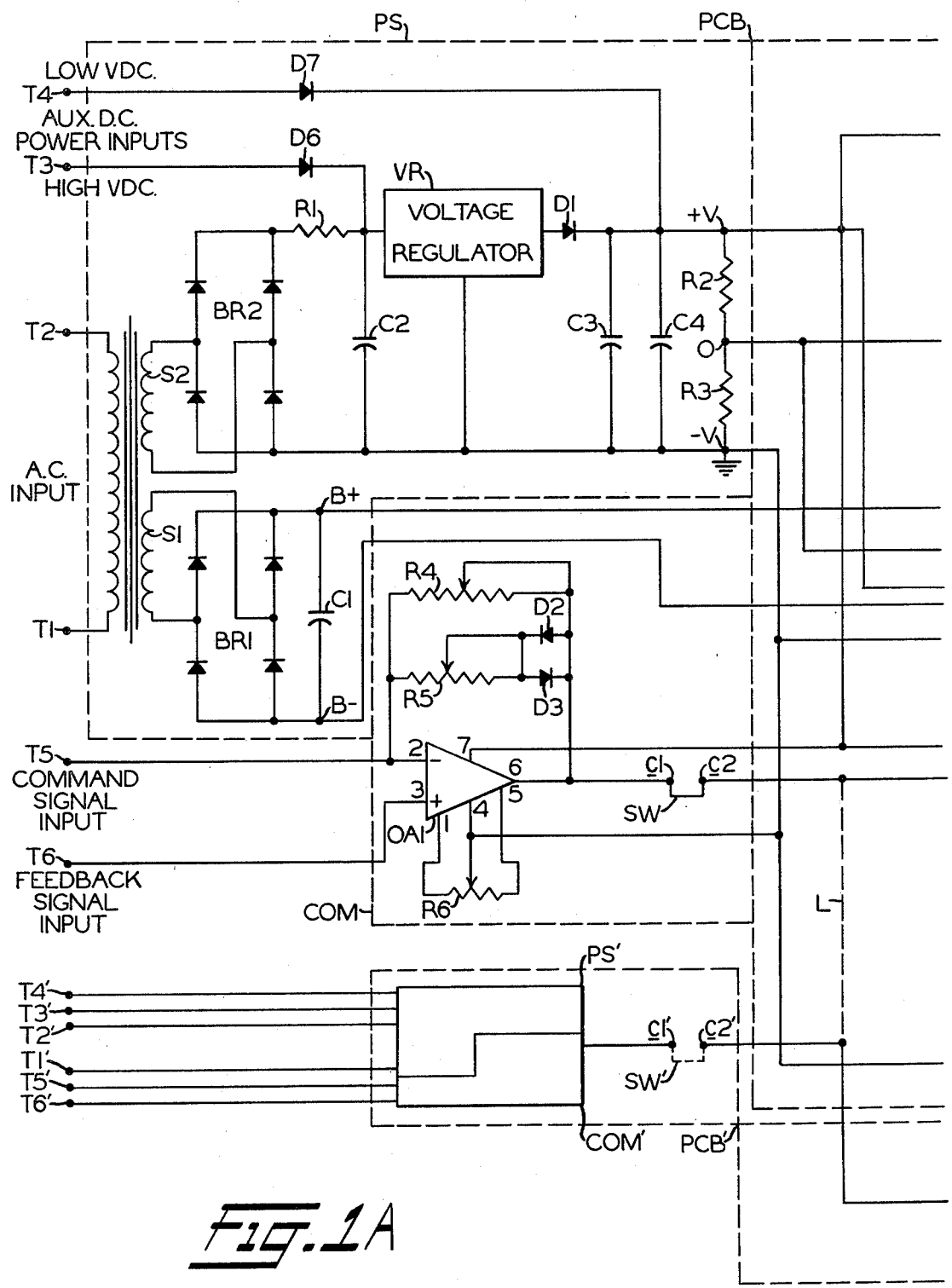
FIGS. 1A and 1B, when arranged side-by-side with FIG. 1A disposed on the left, are a schematic circuit diagram illustrating a solid-state equalizing control circuit embodying the present invention.
Figure 1B:
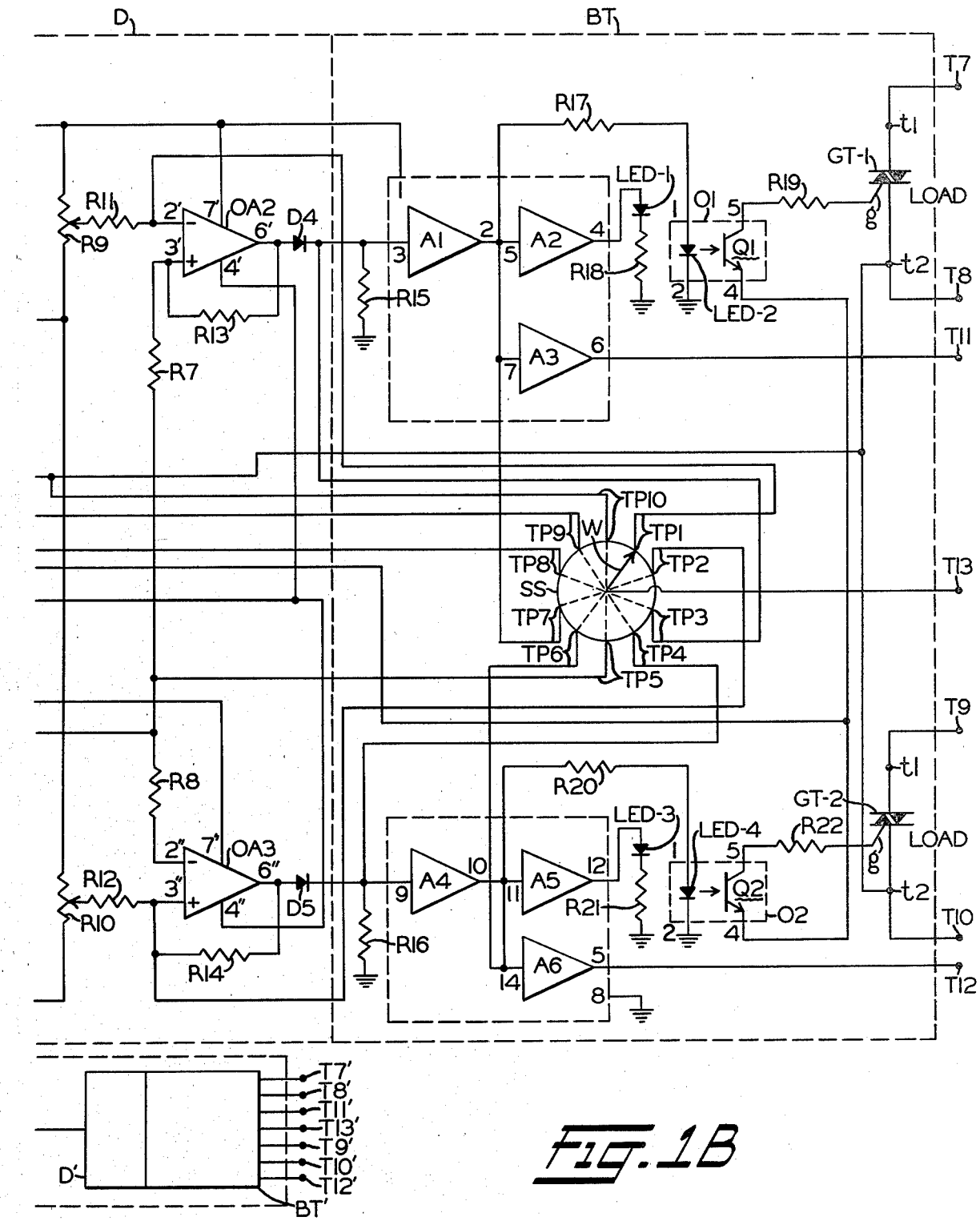

Referring now to the drawings, namely, FIGS. 1A and 1B, there is shown an electronic balance control circuit arrangement which stabilizes an output condition to a command signal by comparing a feedback signal to the command signal. The control circuit includes a power supply PS, a comparator COM, a detector D, and a buffer trigger BT which are mounted on a single plug-in printed circuit board PCB. As shown, it may be necessary or desirable to employ an associated or auxiliary printed circuit board having power supply PS', comparator COM', detector D', and buffer trigger BT', which are all mounted on plug-in printed circuit board PCB' which are substantially identical to the power supply PS, comparator COM, detector D, and buffer trigger BT of printed circuit board PCB, the purpose of which will be described hereinafter.

It will be noted that the power supply PS includes a plurality of input power terminals for accommodating a variety or multiple types of different voltage sources. For example, the plug-in printed circuit board includes terminals T1 and T2 which accommodate an a.c. input voltage, such as, a conventional 115 volt, 60 Hz source, while plug-in terminals T3 and T4 handle a high d.c. voltage source and a low d.c. voltage source, as will be described hereinafter. In the present description, it will be assumed that a.c. power is applied to input terminals T1 and T2 and that no d.c. voltage appears on terminals T3 and T4. As shown, the input terminal T1 is connected to the lower end of primary winding P of transformer T while the input terminal T2 is connected to the upper end of primary winding P. The transformer T includes a pair of secndary windings S1 and S2 which supply a.c. voltage to the a.c. input terminals of bridge rectifiers BR1 and BR2, respectively. A filter capacitor C1 is connected across the d.c. output terminals of bridge rectifier BR1 which develops a positive voltage on terminal B+ and a negative voltage on terminal B−. As shown, a current limiting resistor R1 is connected to the positive output terminal of bridge rectifier BR2. A filter capacitor C2 is connected between resistor R1 and the negative terminal of bridge rectifier BR2 which is grounded. A single chip voltage regulator VR, such as, a designated type 7815 manufactured and sold by Motorola, Inc., is connected across capacitor C2. The output of voltage regulator VR is connected to the anode of diode D1 while its cathode is connected to the upper plates of filter capacitors C3 and C4. The lower plates f capacitors C3 and C4 are connected to ground. A voltage divider including resistors R2 and R3 is connected across the filter capacitor C4. The resistive values of resistors R2 and R3 are identical, and a common lead O is connected to the junction between resistors R2 and R3. Thus, the upper positive terminal +V has an absolute value that is the same as the negative ground terminal −V. In the present instance, the supply terminals B+, B−, +V, −V, and O supply the necessary d.c. operating and biasing voltages for the remaining circuits which will be described shortly.

As shown, the printed circuit board PCB includes another pair of plug-in input terminals T5 and T6. The input terminal T5 receives a command signal which represents the desired output condition, such as, the requested smokestack exhaust pressure of a steel making furnace or power generating boiler. There is shown and described in our copending U.S. application Ser. No. 103,802 filed concurrently herewith, entitled Hydraulic Valve Position Control System for Regulating Smokestack Exhaust Pressure, and assigned to the same assignee as the subject application, a system for controlling the furnace exhaust gas pressure for a steel making facility. As noted in the above application, a rheostat is selectively positioned in accordance with the smokestack exhaust pressure desired to be maintained. The particular position of the wiper contact or movable slide on the rheostat establishes a command signal voltage which corresponds to the desired output condition or requisite exhaust pressure. Further, in viewing FIG. 1A of the present drawings, it will be noted that a feedback signal is applied to the plug-in input terminal T6. The feedback signal is derived from a suitable pressure transducer which constantly monitors the existing output condition, namely, the actual exhaust gas pressure that is present in the smokestack. In practice, the smokestack pressure is sensed by the pressure transducer which operates a potentiometer to produce a representative feedback voltage signal on input terminal T6. As shown, the command and feedback signals are fed to the respective inputs of an integrated circuit operational amplifier comparator circuit COM. That is, the command signal appearing on terminal T5 is connected to the negative or inverting input 2 of differential operational amplifier OA1 which may be designated type 741 OP-AMP which is manufactured and sold by the Fairchild Semiconductor Corporation of Mountainview, Calif. The feedback signal which appears on terminal T6 is connected to the positive or noninverting input 3 of operational amplifier OA1. Power is supplied to the operational amplifier OA1 at terminals 4 and 7. It will be seen that terminal 4 is connected to the d.c. voltage supply terminal +V while the terminal 7 is connected to the d.c. voltage supply terminal −V. The gain of the operational amplifier OA1 is established by a dual feedback network which is connected between output 6 and input 2. As shown, a relatively large potentiometer or adjustable resistor R4 provides a small amount of feedback when the absolute value of the output voltage is below a predetermined level while a relatively small potentiometer or adjustable resistor R5 and a pair of back-to-back diodes D2 and D3 which provide a large amount of feedback when the output voltage exceeds the predetermined level, namely, the forward voltage drop of either diode D2 or diode D3. It will be appreciated that the gain may be varied by changing the position of the wiper contact of potentiometers R4 and R5. Thus, the dual gain feature provides higher sensitivity without oscillation. Further, the comparator circuit OA1 is initially nulled by moving the centering slide of potentiometer or variable resistor R6. As shown, the left end of resistor R6 is connected to terminal 1, the right end is connected to terminal 5 and the wiper contact or slide is connected to terminal 4 of the operational amplifier OA1. In operation, a positive output signal will be developed on output terminal 6 of operational amplifier OA1 when the feedback signal voltage on noninverting input 3 is greater than the command signal voltage on inverting input 2. Conversely, a negative output signal will be developed on outut terminal 6 when the command signal voltage on inverting input 2 is greater than the feedback signal voltage on input 3. Further, if the command signal voltage and the feedback signal voltage are identical or equal, then a balanced or zero volts will appear on output terminal 6 of comparator circuit OA1.

The output terminal 6 of operational amplifier comparator circuit OA1 is connected to the input of the detector circuit D via a jumper wire SW which is shown bridging contacts c1 and c2. That is, the output terminal 6 is connected through the closed switch SW to the junction point formed between resistors R7 and R8. As shown, the upper end of resistor R7 is connected to the positive or noninverting input 3' of a positive voltage detecting integrated circuit operational amplifier OA2 which is a designated type 741 OP-AMP while the lower end of resistor R8 is connected to the negative or inverting input 2" of a negative voltage detecting integrated circuit operational amplifier OA3 which is also a designated type 741 OP-AMP. It will be noted that a proportional voltage divider including a potentiometer or variable resistor R9 and a potentiometer or variable resistor R10 is connected to the respective voltage supply terminals +V and −V. The sliding contact of potentiometer R9 is connected to the negative or inverting input terminal 2' of OP-AMP OA2 via resistor R11 while the sliding contact of potentiometer R10 is connected to the positive or noninverting input terminal 3" via resistor R12. As shown, the positive voltage supply +V is connected to terminals 7' and 7" of OP-AMPS OA2 and OA3 while the negative voltage supply terminal −V is connected to terminals 4' and 4" of OP-AMPS OA2 and OA3. A feedback resistor R13 is connected from output terminal 6' to the noninverting input terminal 3' of the positive detector OP-AMP OA2 while a feedback resistor R14 is connected from output terminal 6" to noninverting input terminal 3" of the negative detector OP-AMP OA3. The positive feedback provides enough hysteresis to prevent oscillation at the set point transition of the OP-AMPS OA2 and OA3.

The outputs from the positive and negative detectors OA2 and OA3 are coupled to inputs of respective inputs of the buffer trigger circuit BT. As shown, the output terminal 6' of positive detector OA2 is connected to the anode of diode D4 while the cathode of diode D4 is connected to the upper end of resistor R15 and input terminal 3 of input stage A1 of one-half of CMOS/TTL, such as, MC14050B hex dual in-line integrated circuit noninverting buffer circuit sold by Motorola, Inc. The lower end of resistor R15 is connected to ground. Similarly, the output terminal 6" of negative detector OA3 is connected to the anode of diode D5 while the cathode of diode D5 is connected to the upper end of resistor R16 and input terminal 9 of the input stage A4 which is the other half of the MC14050B IC noninverting buffer. As shown, the CMOS/TTL circuit is powered by the +V and −V voltages which is connected to terminals 1 and 8, respectively. The output derived from terminal 2 of stage A1 is fed to input terminal 5 of the noninverting stage A2 and also to input terminal 7 of the noninverting stage A3. The output terminal 2 of stage A1 is also connected to input terminal 1 of opto-isolator O1 via resistor R17. It will be noted that at the output terminal 4 of stage A2 is connected a red light emitting diode indicator LED-1 and a series resistor R18. The output terminal 6 of stage A3 may be employed to supply operating power to a suitable external solid-stage relay or the like which may be connected to output plug-in terminal T11 under certain circumstances. It will be seen that the opto-isolator O1 includes a light emitting diode LED-2 and a light responsive transistor Q1. The anode of diode LED-2 is connected to terminal 1 while its cathode is connected to ground terminal 2. The phototransistor Q1 includes a light responsive base, an emitter, and a collector. The emitter electrode is connected to terminal 4 of opto-isolator O1 which, in turn, is connected to d.c. voltage supply terminal −B while the collector electrode is connected to terminal 5 of opto-isolator O1 which, in turn, is connected to gate electrode 9 of a bidirectional semiconductive switching device or triac GT-1 via resistor R19. The main terminals t1 and t2 of triac GT-1 are coupled to output terminals T7 and T8 which are connected to the energizable coil of a supply pressure solenoid control valve. As shown, the main terminal t2 is connected to the d.c. voltage terminal +B. The supply solenoid coil is energizable by a suitable a.c. voltage source when the gate electrode g of triac GT-1 is triggered by the opto-isolator O1.

The amplified output derived from terminal 10 of noninverting stage A4 is fed to input terminal 11 of noninverting stage A5 and also to input terminal 14 of noninverting stage A6. The output terminal 10 of stage A4 is also connected to input terminal 1 of opto-isolator O2 via resistor R20. It will be noted that output terminal 12 of stage A5 is connected to a green light emitting diode indicator LED-3 and series resistor R21. The output terminal 5 of stage A6 may be utilized to supply operating power to an external solid-stage relay which is connectable to output terminal T12. It will be observed that the opto-isolator O2 includes a light emitting diode LED-4 and a phototransistor Q2. The anode of diode LED-4 is connected to terminal 1 of opto-isolator O2 while its cathode is connected to ground terminal 2. The light responsive transistor Q2 includes a light responsive base, an emitter, and a collector. The emitter electrode is connected to terminal 4 of opto-isolator O2 which, in turn, is connected to d.c. voltage supply terminal −B while the collector electrode is connected to terminal 5 of opto-isolator O2 which, in turn, is connected to the gate electrode g of a bidirectional semiconductive switching device or triac GT-2 via resistor R22. The main terminals t1 and t2 of triac GT-2 are coupled to output terminals T9 and T10 which are coupled to the energizable coil of an exhaust pressure solenoid control valve. The exhaust solenoid coil is energized when the gate electrode g of triac GT-2 is triggered by the opto-isolator O2.

It has been found highly advantageous in checking and testing the operation of the control circuit to provide a multiposition selector switch SS which is interconnected to selected points. In the present instance, the selector switch SS is a ten-position switching device having rotatable wiper W connected to an output terminal T13 which is connectable to a measuring device, such as, a voltmeter, oscilloscope, or the like, for checking the voltage on test points TP1 through TP10. As shown, test point TP1 is connected to inverting input terminal 2' of OP-AMP OA2 while the test point TP2 is connected to the noninverting input terminal 3'' of OP-AMP OA3. The test point TP3 is connected to input terminal 3 of stage A1 while the test point TP4 is coupled to input terminal 9 of stage A4. The test point TP5 is connected to the junction point formed between resistors R7 and R8. The test point TP6 is connected to input terminals 11 and 14 of stages A5 and A6, respectively. The test point TP7 is connected to input terminals 5 and 7 of stages A2 and A3. The test point TP8 is connected to the positive d.c. supply voltage terminal +V while the test point TP9 is connected to the common or zero voltage terminal O of the power supply PS. The test point TP10 is connected to the positive d.c. supply voltage terminal +B. Thus, the voltage or signal levels at the various circuit test points may be quickly and easily checked and verified to evaluate the operation and to locate any malfunction. As previously mentioned, the presently described electronic balance control circuit may be alternatively powered by either a high or a low d.c. voltage source. For example, a 17-30 volt source is applicable to input terminal T3 and, in turn, is connectable via a diode to the input of the voltage regulator VR for providing regulated d.c. operating potential. Likewise, a 9-17 volt source is applicable to input terminal T4 and, in turn, is connectable via diode D7 to positive supply terminal +V.

Further, as mentioned above, the foregoing components and elements are mounted on a single printed circuit board PCB so that the output on terminals T7 and T8 may control a solenoid supply valve for opening a butterfly valve in the smokestack and so that the output on terminals T9 and T10 may control a solenoid exhaust valve for closing the butterfly valve. However, when a large and a small butterfly valve are disposed within the smokestack, it may be desirable to provide a rangefinder or course and/or a trim or fine adjustment of the exhaust pressure. Under such an application, it is necessary to furnish an additional printed circuit board PCB' which is interconnected with the printed circuit board PCB via lead L shown in phantom. It will be seen that the jumper wire SW bridges contacts c1 and c2 while the jumper wire SW' shown in phantom is unbridged so that contacts c1' and c2' are opened. Under such a condition, the printed circuit board PCB functions as the master circuit for trim adjustments and the printed circuit board PCB' operates as the slave circuit for rangefinder adjustments. In practice, if the smokestack pressure exceeds a predetermined value, the range-finder control butterfly valve may be actuated to make the initial coarse adjustment in the exhaust pressure and when the smokestack pressure approaches the desired preselected value, the trim control butterfly valve may be operated to effect the final fine adjustment in the exhaust pressure. Alternatively, both the rangefinder and the trim control valves may be initially operated concurrently to adjust a large deviation in the exhaust pressure, and when the exhaust pressure approaches the set value, the trim control valve continues to make the final fine adjustment in the exhaust pressure. Further, it will be appreciated that the printed circuit board PCB' may be dispensed with when it is only necessary to provide either a trim or a rangefinder adjustment in a given installation.

In describing the operation, it will be assumed that the latter condition exists so that the printed circuit board PCB functions in the following manner. Let us assume that the circuit is intact and functioning properly and that the power supply PS is furnished with a.c. voltage on terminals T1 and T2 so that the necessary operating and biasing voltages are applied to the printed circuit board PCB from the d.c. voltage terminals B+, B−, +V, and −V. Further, let us assume that the system is balanced so that the command signal input on terminal T5 is equal to the feedback signal input on terminal T6 or that both input signals are at zero (0) volts. Under this assumed condition, the output on terminal 6 of OP-AMP OA1 should be at zero voltage level, and if it is not, the slide contact on nulling resistor R6 is moved in the appropriate direction to null or zero the output on terminal 6. Since the voltage on output terminal 6 of OP-AMP OA1 is at a zero (0) voltage level, the input on noninverting input 3 of OP-AMP OA2 is the same as the input inverting input 2 of OP-AMP OA3. Thus, neither the positive nor the negative detectors produces a positive output so that the buffer trigger circuits remain quiescent and triacs GT-1 and GT-2 remain non-conductive.

Let us now assume that a higher smokestack exhaust pressure is desired or needed so that the plant operator turns the rheostat to increase the voltage on the command signal input terminal T5. Thus, the input voltage on inverting input 2 becomes greater than input voltage on noninverting input 3 so that a negative voltage proportional to the difference between the command input signal and the feedback input signal is developed on the output terminal 6. As previously mentioned, greater sensitivity is realized by the dual feedback loop without enhancing the chance of oscillation. The negative voltage developed on output terminal 6 is applied to inverting input terminal 2'' of negative detecting OP-AMP OA3 so that a positive output is developed on its output terminal 6''. That is, the negative voltage which is conveyed via jumper wire SW and resistor R8 to the inverting input terminal 2'' of OP-AMP OA3 causes a positive signal to be developed on output terminal 6'' when the inverting input becomes more negative than the noninverting input on terminal 3''. The positive signal developed on output terminal 6'' is fed to noninverting stage A4 via diode D5 so that a positive output voltage is developed on terminal 10. The positive voltage is further passed onto the output terminal 12 of stage A5 which results in the lighting of a green exhaust indicator LED-3 to alert the operator of the ensuing increase of the exhaust pressure. The positive voltage on terminal 10 also causes the light emitting diode LED-4 to become illuminated which, in turn, causes the conduction of phototransistor Q2. The conduction of transistor Q2 results in the triggering of triac GT-2. The conduction of triac GT-2 results in the energization of the associated solenoid coil to cause the closure of the butterfly valve to increase the exhaust pressure in the smokestack. The resultant pressure increase is sensed by the pressure transducer which causes an increase in the feedback voltage signal that appears on input terminal T6. Thus, the differential voltage between the two inputs on OP-AMP 1 decreases so that the output voltage is proportionally decreased on terminal 6. When the differential between the output on terminal 6 and the input on terminal 2 falls below forward voltage drop of diode D3, the feedback shifts from the low resistive path to the high resistive path due to the nonconduction of diode D3. The output voltage on terminal 6 will assume a zero voltage level when the feedback input signal reaches a value equal to that of the command input signal. Thus, the control circuit is balanced when the output terminal is zero and the negative detector and the associated buffer trigger again assume a quiescent condition so that the triac GT-2 is turned off due to the nonconduction of phototransistor Q2. The feedback input signal is equal to the command input signal so long as the system remains balanced, namely, the existing exhaust pressure in the smokestack is in equilibrium with the requested exhaust pressure at the remote control center.

Let us now assume that a decrease in the smokestack exhaust pressure is initiated for enhancing the operation of the plant. The operator simply dials in the desired reduced exhaust pressure value which results in a decrease in the voltage level on command signal input terminal T5. Thus, the voltage on the inverting input 2 becomes less than the voltage on noninverting input 3 so that a positive going voltage is developed on the output terminal 6 of OP-AMP OA1. Again, the sensitivity of the OP-AMP OA1 is increased when the diode D2 conducts and provides a large amount of feedback to input terminal 2. The positive output signal on terminal 6 of OP-AMP OA1 is fed to the noninverting input terminal 3' of positive detecting OP-AMP OA2 via jumper SW and resistor R7. Thus, the OP-AMP OA2 produces a positive signal when the voltage on noninverting input terminal 3' exceeds the positive reference voltage on inverting input terminal 2'. The positive voltage signal developed on output terminal 6 is fed to noninverting stage A1 via diode D4. The output signal derived from output terminal 2 of stage A1 causes the conduction and illumination of both light emitting diodes LED-1 and LED-2 via resistor R17 and output stage A2, respectively. The illumination of LED-2 results in the triggering and conduction of triac GT-1 while the illumination of LED-1 provides a visual indication that a decrease in the exhaust pressure is underway. The firing of triac GT-1 results in the energization of the solenoid coil of the a.c. supply valve which initiates the opening of the butterfly valve to reduce the exhaust pressure in the smokestack. The reduction in exhaust pressure is sensed and monitored by the pressure transducer which sends back a feedback signal to terminal T6 and input 3 of OP-AMP OA1. As the differential voltage between input terminals 3 and 2 gets smaller, the positive output voltage on terminal 6 of OP-AMP OA1 decreases and when the voltage between terminals 6 and 2 becomes less than a forward voltage drop of diode D2, the diode D2 is rendered not connected so that a feedback path is established through the relatively large resistor R4. The high resistance of this feedback path reduces the chances of the OP-AMP OA1 going into oscillation. Now, when the feedback signal becomes equal to the command signal, the output of OP-AMP OA1 becomes zero (0) so that the OP-AMP OA2, noninverting stages A1, A2, and A3 become quiescent. This causes LED-1 and LED-2 to turn off with the latter rendering triac GR-1 nonconductive which de-energizes the supply solenoid valve and stops movement of the butterfly valve at the proper opening. Thus, the exhaust pressure in the smokestack may be accurately controlled and effectively regulated by the presently described electronic balance control circuit from a long distance remote location.

It will be appreciated that, while this invention has been described in relation to a smokestack exhaust pressure control system, it is readily apparent that the presently described electronic balance control circuit may be employed in other systems and equipment, such as, any installation that requires the remote control of a desired condition by monitoring and comparing a given command signal with a feedback signal. Further, it is understood that various changes, alterations, and modifications may be made to presently describe a control circuit arrangement without departing from the spirit and scope of the invention. For example, the triacs may be replaced by silicon controlled rectifiers (SCR) when the loads connected to output terminals T7, T8, T9, and T10 are d.c. voltage devices. As mentioned above, the control circuit may be powered by either a high or a low d.c. auxiliary power source. In addition, any number of printed circuit boards may be interconnected in a master and slave arrangement depending upon the number of output conditions which must be controlled. Additionally, it will be readily understood that the different values of the command and feedback voltages may be accommodated by inserting different calibrating resistors between input terminals T5 and T6 and inverting and noninverting inputs 2 and 3. Likewise, a suitable calibration resistor may be connected from terminal T5 and ground and also a suitable calibration resistor may be connected from terminal T6 and ground when sensing a current. Further, it is evident that regardless of the manner in which the invention is used, it is understood that various changes, ramifications, and equivalents may be made by persons skilled in the art without departing from the inventive concept. Thus, it will be appreciated that all modifications, alterations, and equals falling within bounds of the present invention are herein meant to be included in the appended claims.

Having now described the invention, what we claim as new and desire to secure by Letters Patent is:

1. An electronic balance control circuit comprising, a comparator circuit having a command signal input and a feedback signal input and producing a positive, a negative, and a zero output in response to the comparative value of the feedback signal relative to the command signal, a first detector circuit responsive to the positive output, a second detector responsive to the negative output, a first buffer trigger circuit coupled to said first detector circuit for actuating a first gate circuit which includes a gate controlled semiconductive switch when the feedback signal is less than the command signal to increase the feedback signal until said comparator circuit produces a zero output, and a second buffer trigger circuit coupled to said second detector circuit for actuating a second gate circuit which includes a gate controlled semiconductive switch when the feedback signal is greater than the command signal to decrease the feedback signal until said comparator circuit produces a zero output.

2. The electronic balance control circuit as defined in claim 1, wherein said comparator circuit is an integrated circuit operational amplifier.

3. The electronic balance control circuit as defined in claim 2, wherein said integrated circuit operational amplifier includes a dual gain feedback network.

4. The electronic balance control circuit as defined in claim 3, wherein said dual gain feedback network includes a resistive circuit path and a resistive diode circuit path.

5. The electronic balance control circuit as defined in claim 1, wherein each of said first and second detector circuits includes an integrated operational amplifier having hysteresis to prevent spurious oscillations.

6. The electronic balance control circuit as defined in claim 1, wherein each of said first and second buffer trigger circuits each includes one-half of a hex dual in line integrated circuit noninverter.

7. The electronic balance control circuit as defined in claim 1, wherein each of said first and second buffer trigger circuits each includes an opto-isolator.

8. The electronic balance control circuit as defined in claim 1, wherein a multiposition selector switch is connected to said first and second detector circuits and said first and second buffer trigger circuits for providing for testing the voltage at various points of the balance control circuit.

9. The electronic balance control circuit as defined in claim 6, wherein a light emitting diode indicator is coupled to each half of said hex dual in line integrated circuit noninverter.

10. The electronic balance control circuit as defined in claim 1, wherein a jumper is interposed between said comparator circuit and said first and second detector circuits.

11. The electronic balance control circuit as defined in claim 1, wherein affiliated detector and buffer circuits are interconnectable by a jumper connector with said comparator circuit for operating as a slave circuit.

12. The electronic balance control circuit as defined in claim 1, wherein an affiliated comparator circuit is interconnected by a jumper wire with said first and second detector circuit for operating as a master circuit.

13. The electronic balance control circuit as defined in claim 1, wherein a multiple source power supply furnishes operating and biasing voltages to the circuits.

14. A solid-state controller circuit for equalizing a command signal and feedback signal comprising, a comparator means having a first input for receiving a command signal and having a second input for receiving a feedback signal, said comparator means producing an output signal having a first polarity when the command signal is greater than the feedback signal and producing an output signal having a second polarity when the command signal is less than the feedback signal, a first detector means responsive to the first polarity output signal for producing an output signal, a second detector means responsive to the second polarity output signal for producing an output signal, a first buffer trigger means is responsive to the output signal of said first detector means for energizing a first gating means which includes a bidirectional switching device until the feedback signal is the same as the command signal, and a second buffer trigger means is responsive to the output signal of said second detector means for energizing a second gating means which includes a bidirectional switching device until the feedback signal is the same as the command signal.

* * * * *